(12) United States Patent
Fujita

(10) Patent No.: US 11,262,210 B2
(45) Date of Patent: Mar. 1, 2022

(54) MAP DATA STORAGE METHOD AND DEVICE

(71) Applicant: Nissan Motor Co., Ltd., Yokohama (JP)

(72) Inventor: Susumu Fujita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/622,013

(22) PCT Filed: Jun. 13, 2017

(86) PCT No.: PCT/JP2017/021829
§ 371 (c)(1),
(2) Date: Dec. 12, 2019

(87) PCT Pub. No.: WO2018/229872
PCT Pub. Date: Dec. 20, 2018

(65) Prior Publication Data
US 2020/0378788 A1    Dec. 3, 2020

(51) Int. Cl.
*G01C 21/00* (2006.01)
*G06T 11/20* (2006.01)
*G08G 1/13* (2006.01)
*G09B 29/00* (2006.01)

(52) U.S. Cl.
CPC ..... *G01C 21/3819* (2020.08); *G01C 21/3837* (2020.08); *G06T 11/203* (2013.01); *G08G 1/13* (2013.01); *G09B 29/003* (2013.01)

(58) Field of Classification Search
CPC ............ G01C 21/3819; G01C 21/3837; G01C 21/32; G01C 21/3667; G09B 29/003; G09B 29/00; G08G 1/13; G08G 1/01; G06T 11/203
See application file for complete search history.

(56) References Cited

U.S. PATENT DOCUMENTS

| | | | |
|---|---|---|---|
| 8,359,156 B2 * | 1/2013 | Guo ....................... | G01C 21/32 701/411 |
| 2006/0106534 A1 * | 5/2006 | Kawamata ............. | G01C 21/32 701/532 |
| 2008/0082255 A1 | 4/2008 | Takahata et al. | |

(Continued)

FOREIGN PATENT DOCUMENTS

| | | |
|---|---|---|
| DE | 102013103041 A1 | 10/2013 |
| EP | 0807803 A2 | 11/1997 |

(Continued)

*Primary Examiner* — Nga X Nguyen
(74) *Attorney, Agent, or Firm* — Young Basile Hanlon & MacFarlane, P.C.

(57) ABSTRACT

A map data storage method for acquiring map data content used in a subject vehicle and storing the map data content in a common database by using a controller is provided. This method includes converting a format of the acquired map data content to a predetermined format that can be used in the subject vehicle, storing the map data content converted into the predetermined format in the common database, acquiring update information regarding the map data content stored in the common database, and editing the map data content in the predetermined format stored in the common database on the basis of the acquired update information.

18 Claims, 14 Drawing Sheets

(56) References Cited

U.S. PATENT DOCUMENTS

| | | | |
|---|---|---|---|
| 2009/0063424 A1* | 3/2009 | Iwamura | G06F 16/29 |
| 2010/0042315 A1 | 2/2010 | Ikeuchi et al. | |
| 2010/0274469 A1 | 10/2010 | Takahata et al. | |
| 2012/0065878 A1 | 3/2012 | Yeh et al. | |
| 2013/0066611 A1 | 3/2013 | Yamada | |
| 2014/0253557 A1* | 9/2014 | Park | G01C 21/32 |
| | | | 345/440 |
| 2016/0034495 A1 | 2/2016 | Yano et al. | |
| 2017/0314932 A1 | 11/2017 | Miwa et al. | |
| 2018/0273031 A1 | 9/2018 | Fujita et al. | |
| 2019/0001986 A1 | 1/2019 | Horita et al. | |

FOREIGN PATENT DOCUMENTS

| | | |
|---|---|---|
| JP | 2003-091443 A | 3/2003 |
| JP | 2005-291872 A | 10/2005 |
| JP | 2006-052972 A | 2/2006 |
| JP | 2012-159515 A | 8/2012 |
| JP | 5447662 B2 | 3/2014 |
| JP | 2014-209069 A | 11/2014 |
| JP | 2015-148703 A | 8/2015 |
| KR | 100496814 B1 | 6/2005 |
| WO | 2016/067849 A1 | 5/2016 |
| WO | 2017/010209 A1 | 1/2017 |
| WO | 2017/056249 A1 | 4/2017 |

\* cited by examiner

| index | Lane boundary (left) | Lane boundary (right) |
|---|---|---|
| 0 | xL0, yL0, zL0 | xR0, yR0, zR0 |
| 1 | xL1, yL1, zL1 | xR1, yR1, zR1 |
| 2 | xL2, yL2, zL2 | xR2, yR2, zR2 |
| 3 | xL3, yL3, zL3 | xR3, yR3, zR3 |
| ... | | |

MAP DATA STORAGE METHOD AND DEVICE

TECHNICAL FIELD

The present invention relates to a map data storage method and a map data storage device.

BACKGROUND

A method of updating a map stored in a navigation device is known (see WO2016/067849, for example). This method includes creating difference data between map data being currently referred to by the navigation device and map data of a newest generation, updating the map data on the basis of the difference data, and writing the updated map data to different areas than the areas in which the pre-update map data are stored. If some trouble occurs in the updated map data, the pre-update map data can be referred to.

SUMMARY

The method described in WO2016/067849, however, can only be applied to the map data content in a specific format, and if the map data content in a different type of format is provided, the map data content used in the subject vehicle cannot be edited.

A problem to be solved by the present invention is to provide a map data storage method and a map data storage device with which, even when map data content in a different format than that used in the subject vehicle is acquired, the map data content used in the subject vehicle can be edited on the basis of the acquired map data content.

The present invention solves the above problem through converting a format of the acquired map data content to a predetermined format that can be used in the subject vehicle, storing the map data content converted into the predetermined format in a database, acquiring update information regarding the map data content stored in the database, and editing the map data content in the predetermined format stored in the database on the basis of the acquired update information.

According to the present invention, even when map data content in a different format than that used in the subject vehicle is acquired, the map data content used in the subject vehicle can be edited on the basis of the acquired map data content.

DETAILED DESCRIPTION

Figure 1:
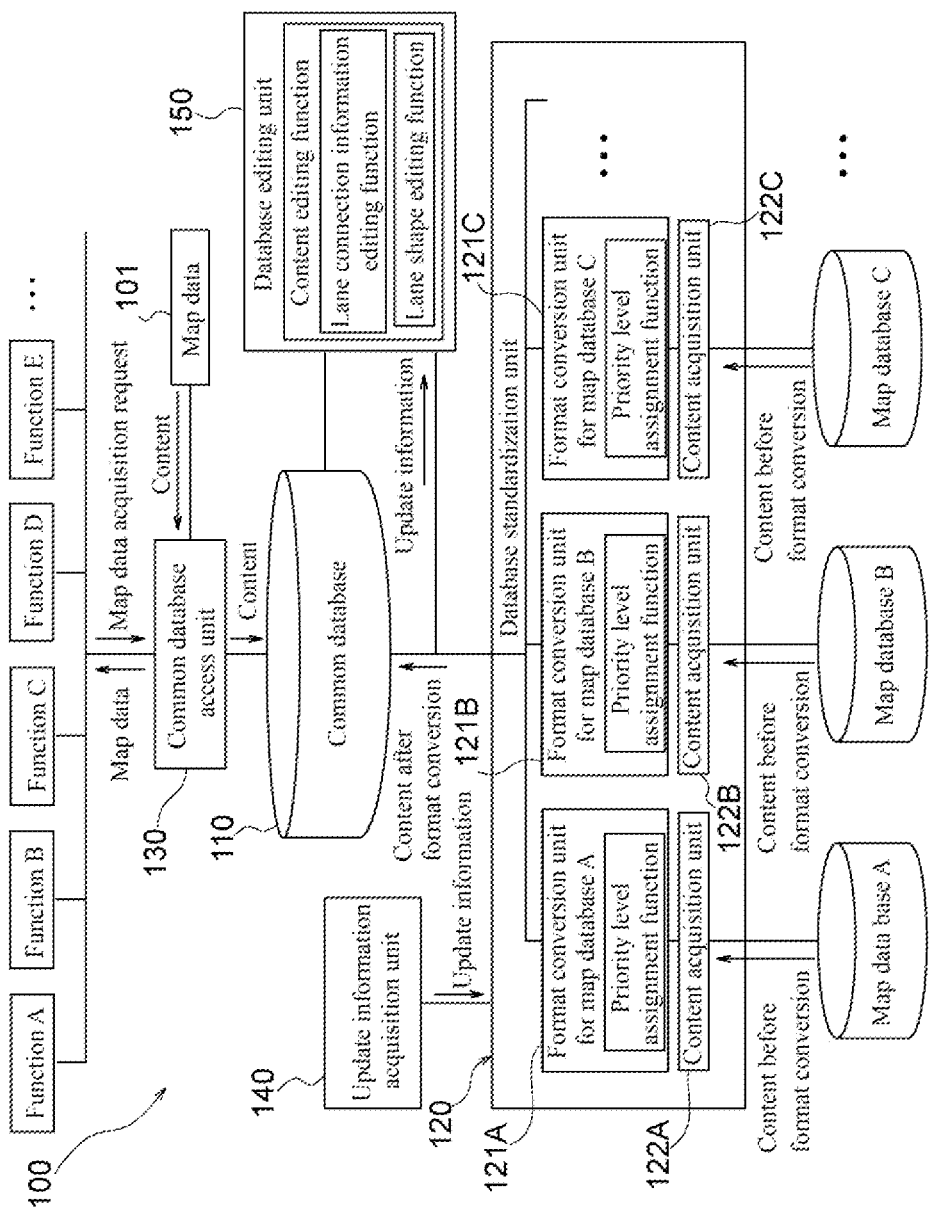
FIG. 1 is a block diagram illustrating the outline of a map data storage device according to one or more embodiments of the present invention.

Hereinafter, one or more embodiments of the present invention will be described with reference to the drawings. FIG. 1 is a block diagram illustrating the outline of a map data storage device 100 according to one or more embodiments of the present invention. The map data storage device 100 illustrated in the figure operates to store the content of a high-definition map (HD map, referred simply to as "map data," hereinafter) in a common database 110. The content of the HD map includes at least lane information and is used in driving assistance or autonomous (automated) driving (referred to as "autonomous driving or the like," hereinafter). Here, the map data storage device 100 operates to: acquire the content in different formats from a plurality of map databases A, B, C, . . . having different formats of content when the vehicle executes the autonomous driving or the like (this execution mode will be referred to as an "online mode," hereinafter); convert the formats of the acquired content to a predetermined format compatible with programs for the autonomous driving or the like of the vehicle; and store the content in the converted format in the common database 110. In addition, the map data storage device 100 operates to acquire update information of the map data from external during the online mode and edit the content stored in the common database 110 on the basis of the acquired update information.

The map data storage device 100 includes map data 101, the common database 110, a database standardization unit 120, a common database access unit 130, an update information acquisition unit 140, and a database editing unit 150. The map data 101 is map data possessed by the subject vehicle, and the format of the content of the map data 101 is a format compatible with programs for the autonomous driving or the like of the subject vehicle. The map data 101 is updated at regular intervals (e.g., every six months or every year), but is not directly edited by the map data storage device 100.

The common database 110 stores the content of the map data 101 and the content acquired from the external map databases A, B, C, . . . . The format of the content acquired from the external map databases A, B, C, . . . and stored in the common database 110 is the same as the format of the content of the map data 101. Examples of the content stored in the common database 110 include a lane centerline, a lane boundary line, a stop line, a crosswalk, a traffic sign, a traffic signal, and a road surface paint. These items of the content are each assigned an ID indicating the type of content, a substance represented by the content, and an index indicating the order of the stored content.

The common database access unit 130 reads the content from the map data 101 and stores the content in the common database 110. In addition, on the basis of an acquisition request for the map data content from a system that executes functions A, B, C, D, E, . . . regarding the autonomous driving or the like, the common database access unit 130 reads the map data content from the common database 110 and outputs the map data content to the system which executes the functions A, B, C, D, E, . . . . The common database access unit 130 reads the map data content in accordance with the index order. Examples of information on the map data content read by the common database access unit 130 include an index, a position (three-dimensional absolute position) at which a lane boundary, a stop line, or the like is drawn, and a position (three-dimensional absolute position) at which a traffic sign, a traffic signal, or the like is installed.

Figure 2:
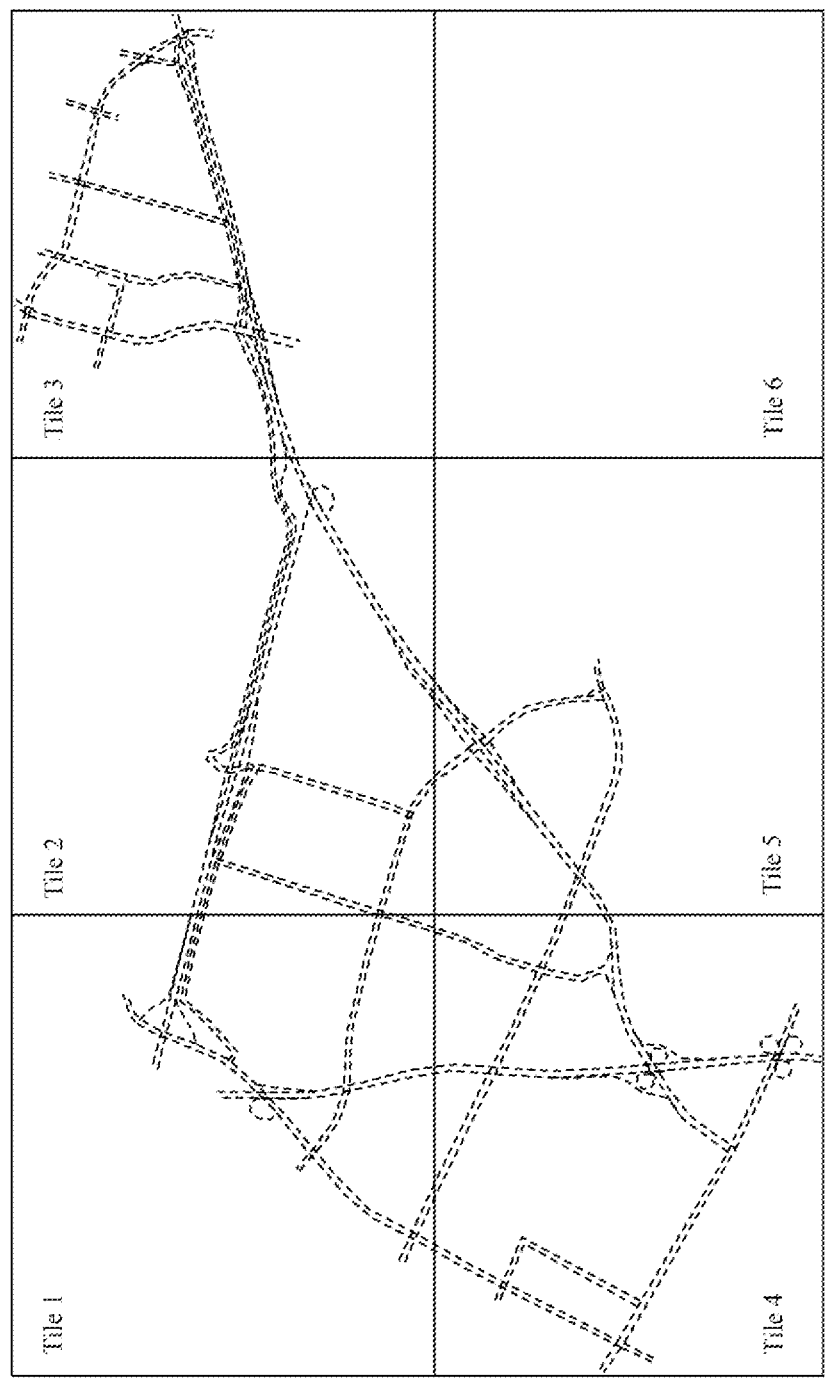
FIG. 2 is a diagram for describing map tiles.

The common database access unit 130 designates an area of the map data for which the content is stored in the common database 110, in accordance with the traveling area (current position) of the subject vehicle. FIG. 2 is a diagram for describing map tiles. As illustrated in the figure, the map data is usually divided into tiles. Each tile of the map data is assigned an ID. The common database access unit 130 specifies the ID of a tile thereby to designate an area of the map data for which the content is stored in the common database 110.

Figure 3:
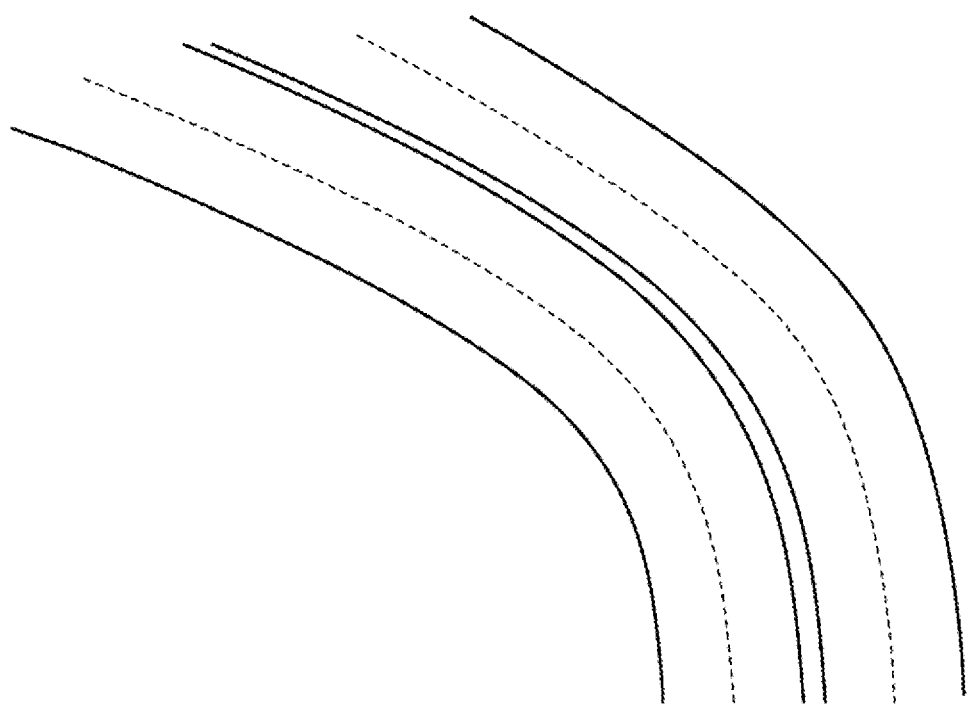
FIG. 3 is a diagram illustrating a curve of a road.

FIG. 3 is a diagram illustrating a curve of a road. With reference to the curve of the road illustrated in the figure, formats of lane boundary lines and lane centerlines of the map data to be stored in the common database 110 in one or more embodiments of the present invention will be described.

Figure 4:
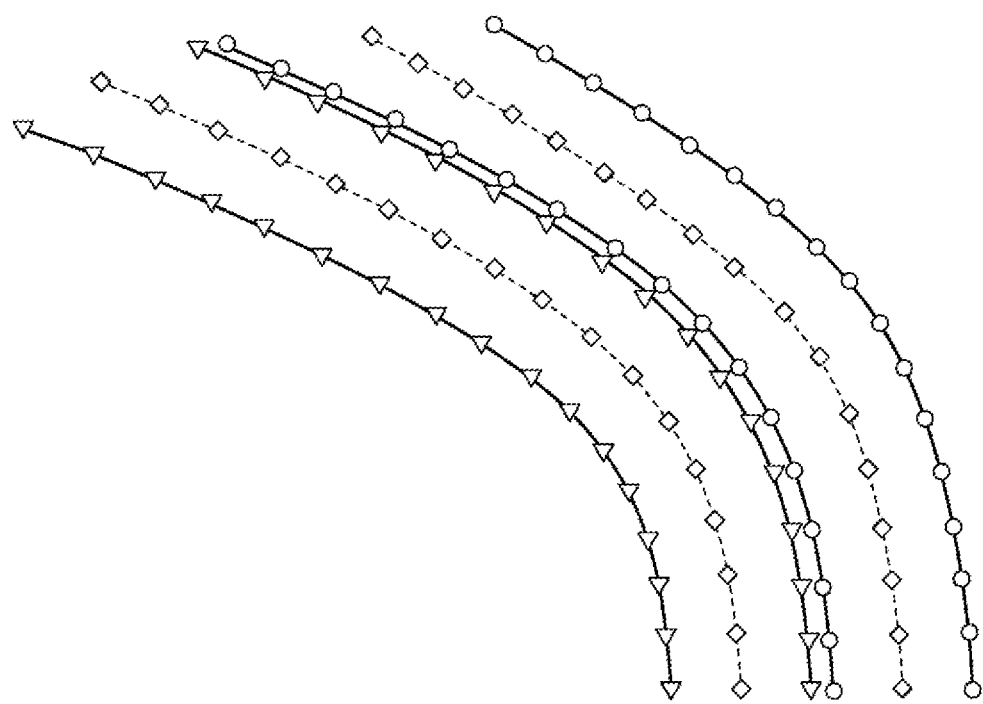
FIG. 4 is a diagram illustrating an example of a format of lane boundary lines and lane centerlines along the curve of the road.
Figure 5:
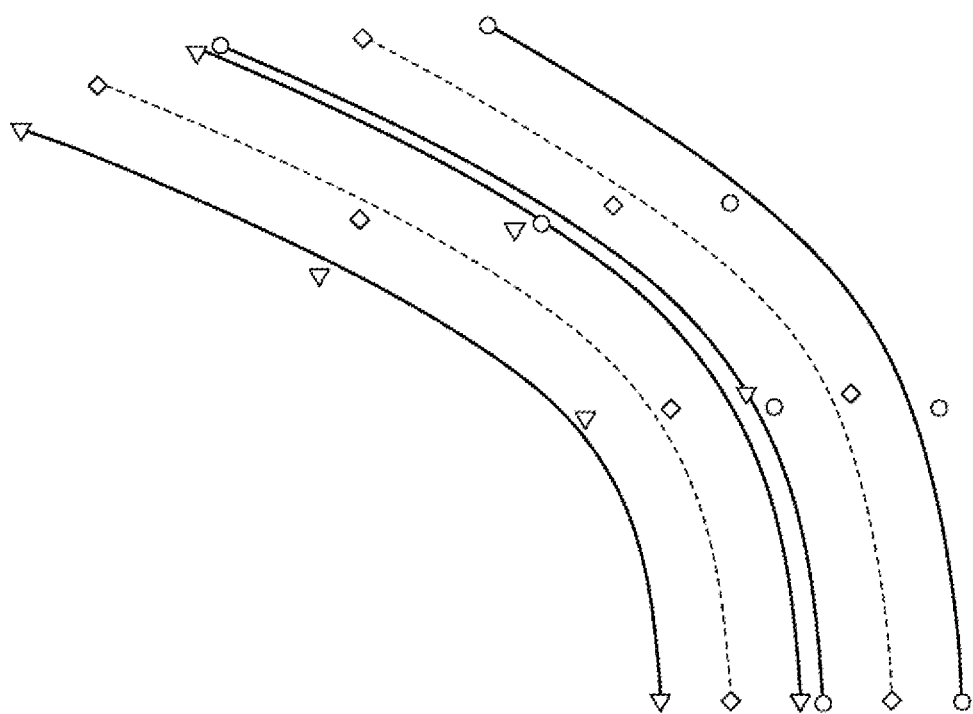
FIG. 5 is a diagram illustrating an example of a format of lane boundary lines and lane centerlines along the curve of the road.

FIG. 4 and FIG. 5 are each a diagram illustrating an example of a format of lane boundary lines (white circles and triangles in the figure) and lane centerlines (diamond shapes in the figure) along the curve of the road. As illustrated in FIG. 4, a format for expressing curves or straight lines by discrete point sequences can be exemplified as the format of the lane boundary lines and lane centerlines of the map data to be stored in the common database 110. Through expressing the lane boundary lines and the lane centerlines by discrete point sequences, information on the point sequences can be stored in the common database 110 without editing. On the other hand, as illustrated in FIG. 5, a format for expressing curves or straight lines by mathematical formulae can also be exemplified as the format of the lane boundary lines and lane centerlines of the map data to be stored in the common database 110. Examples of this format include Basic-Spline (B-Spline) curves and Non-Uniform Rational Basis-Spline (NURBS) curves. The B-Spline curve is a smooth curve defined by a plurality of control points, and the NURBS curve is a smooth curve defined by a plurality of control points and a knot vector.

The database standardization unit 120 includes a format conversion unit 121A for map database A, a format conversion unit 121B for map database B, a format conversion unit 121C for map database C, . . . and content acquisition units 122A, 122B, 122C, . . . . The content acquisition unit 122A acquires the content from the map database A and transmits the content to the format conversion unit 121A for map database A. The content acquisition unit 122B acquires the content from the map database B and transmits the content to the format conversion unit 121B for map database B. The content acquisition unit 122C acquires the content from the map database C and transmits the content to the format conversion unit 121C for map database C.

Here, the formats of content included in the map databases A, B, C, . . . are different from one another. On the other hand, the format of map data content treated by a system that executes the functions A, B, C, D, E, . . . regarding the autonomous driving or the like of the vehicle according to one or more embodiments of the present invention is a format that expresses curves or straight lines by discrete point sequences. In the map data storage device 100 according to one or more embodiments of the present invention, therefore, when the formats of content acquired from the map databases A, B, C, . . . by the content acquisition units 122A, 122B, 122C, . . . are not formats that express curves or straight lines by discrete point sequences, the format conversion unit 121A for map database A, the format conversion unit 121B for map database B, the format conversion unit 121C for map database C, . . . convert the formats of content acquired by the content acquisition units 122A, 122B, 122C, . . . to a format that expresses curves or straight lines by discrete point sequences. For example, when the formats of content acquired from the map databases A, B, C, . . . by the content acquisition units 122A, 122B, 122C, . . . are each a format of B-Spline curves, NURBS curves, or the like, the format conversion unit 121A for map database A, the format conversion unit 121B for map database B, the format conversion unit 121C for map database C, . . . reconstruct the curves on the basis of the definition of B-Spline curves or the like and perform sampling of the reconstructed curves at regular intervals thereby to convert the format of B-Spline curves or the like to a format for expressing curves or straight lines by discrete point sequences.

Figure 6:
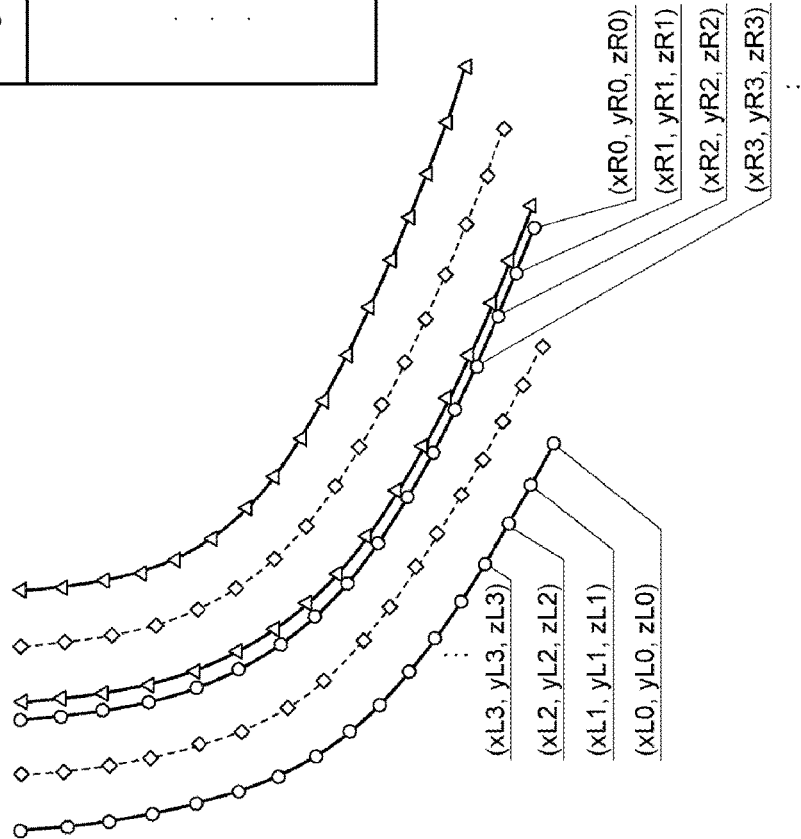
FIG. 6 is a diagram illustrating lane boundary lines as content to be stored in a common database.

The format conversion unit 121A for map database A, the format conversion unit 121B for map database B, the format conversion unit 121C for map database C, . . . store the content, which has been converted into the format for expressing curves or straight lines by discrete point sequences, in the common database 110. FIG. 6 is a diagram illustrating lane boundary lines as the content to be stored in the common database 110. As illustrated in the figure, the format conversion unit 121A for map database A and other format conversion units store, in the common database 110, indexes 0, 1, 2, 3, . . . that indicate the order of storing the content, three-dimensional absolute positions (xL0, yL0, zL0), (xL1, yL1, zL1), (xL2, yL2, zL2), (xL3, yL3, zL3), . . . of the left-side lane boundary line, and three-dimensional absolute positions (xR0, yR0, zR0), (xR1, yR1, zR1), (xR2, yR2, zR2), (xR3, yR3, zR3), . . . of the right-side lane boundary line.

The content acquisition units 122A, 122B, 122C, . . . acquire content that should be stored in the common database 110 but is not stored at the moment, from the map databases A, B, C, . . . . Examples of the content that should be stored in the common database 110 but is not stored at the moment include content that is required from a system executing the functions A, B, C, D, E, . . . regarding the autonomous driving or the like and is not stored in the common database 110. Examples of the content that is required from a system executing the functions A, B, C, D, E, . . . regarding the autonomous driving or the like and is not stored in the common database 110 include stop lines and crosswalks.

Figure 7:
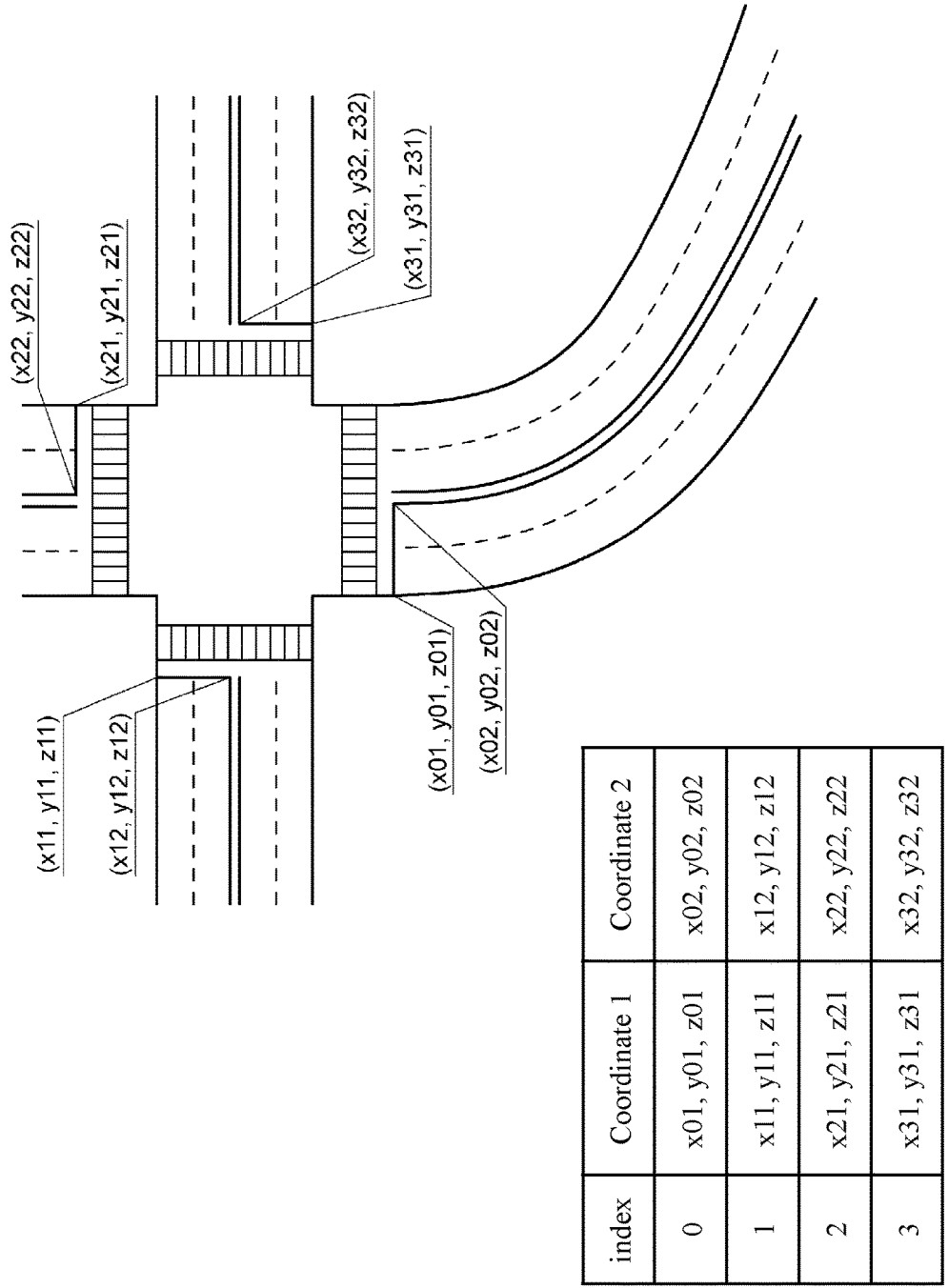
FIG. 7 is a diagram illustrating stop lines as content acquired from map databases A, B, C, . . .

FIG. 7 is a diagram illustrating stop lines as the content acquired from the map databases A, B, C, . . . . As illustrated in the figure, the content acquisition units 122A, 122B, 122C, . . . acquire indexes 0, 1, 2, 3, . . . that indicate the order of storing the content, three-dimensional absolute positions (x01, y01, z01), (x11, y11, z11), (x21, y21, z21), (x31, y31, z31), . . . of one end points of the stop lines, and three-dimensional absolute positions (x02, y02, z02), (x12, y12, z12), (x22, y22, z22), (x32, y32, z32), . . . of the other end points of the stop lines from the map databases A, B, C, . . . . In the map data storage device 100 according to one or more embodiments of the present invention, a format represented by a plurality of points of absolute coordinates, such as the format of stop lines, is processed as a common format to the format represented by point sequences. That is, when content in the format represented by a plurality of points of absolute coordinates is acquired by the content acquisition units 122A, 122B, 122C, . . . , the acquired content is stored in the common database 110 without format conversion by the format conversion unit 121A for map database A, format conversion unit 121B for map database B, format conversion unit 121C for map database C, . . . .

Here, when executing the functions A, B, C, D, E, . . . regarding the autonomous driving or the like, there are high and low levels for achieving the functions, and depending on the level, the type of necessary map data content and the number of items of the map data content are different. For example, to achieve a lane-keeping function on an expressway, lane boundary lines and lane centerlines are required as the map data content. Additionally or alternatively, to achieve an autonomous driving function on a general road, stop lines, crosswalks, traffic signs, etc. are required as the map data content in addition to lane boundary lines and lane centerlines. Accordingly, each of the format conversion unit 121A for map database A, the format conversion unit 121B for map database B, the format conversion unit 121C for map database C, . . . has a priority level assignment function and sets the priority level of content to be acquired in accordance with the level for achieving the corresponding function A, B, C, D, E, . . . . The content acquisition units 122A, 122B, 122C, . . . acquire the content from the map databases A, B, C, . . . in accordance with the set priority levels.

The common database access unit 130 reads the map data content from the common database 110 on the basis of an acquisition request for the map data content from a system that executes the functions A, B, C, D, E, . . . regarding the autonomous driving or the like of the vehicle, and outputs the map data content to the functions A, B, C, D, E, . . . . The common database access unit 130 reads the content in accordance with the index order. Examples of information on the content read by the common database access unit 130 include an index, a position (latitude/longitude) at which a lane boundary, a stop line, or the like is drawn, and a position (latitude/longitude) at which a traffic sign, a traffic signal, or the like is installed.

Here, when the map data content requested by a system that executes the functions A, B, C, D, E, . . . regarding the autonomous driving or the like is stored in the common database 110, the common database access unit 130 reads the requested content from the common database 110 and outputs the requested content to the system which executes the functions A, B, C, D, E, . . . regarding the autonomous driving or the like. On the other hand, when the map data content requested by a system that executes the functions A, B, C, D, E, . . . regarding the autonomous driving or the like is not stored in the common database 110, the content acquisition units 122A, 122B, 122C, . . . acquire the requested content from the map databases A, B, C, . . . . For example, when information on stop lines is requested from a system that executes the functions A, B, C, D, E, . . . regarding the autonomous driving or the like and the information on stop lines is not stored in the common database 110 but is stored in any of the map databases A, B, C, . . . , any of the content acquisition units 122A, 122B, 122C, . . . acquires the information on stop lines from the corresponding map database A, B, C, . . . .

When the map data content requested by a system that executes the functions A, B, C, D, E, . . . regarding the autonomous driving or the like is not stored in the common database 110, the common database access unit 130 may calculate the requested content on the basis of the content stored in the common database 110. For example, information on the remaining distance for the subject vehicle to reach a stop line is useful information when the subject vehicle travels in the vicinity of an intersection of a general road, but such information is not stored in the common database 110. The common database access unit 130 therefore calculates the remaining distance for the subject vehicle to reach the stop line, for example, using information on a lane centerline and information on the stop line that are acquired from the map databases A, B, C, . . . . The common database access unit 130 then stores information on the calculated remaining distance for the subject vehicle to reach the stop line in the common database 110.

Figure 8:
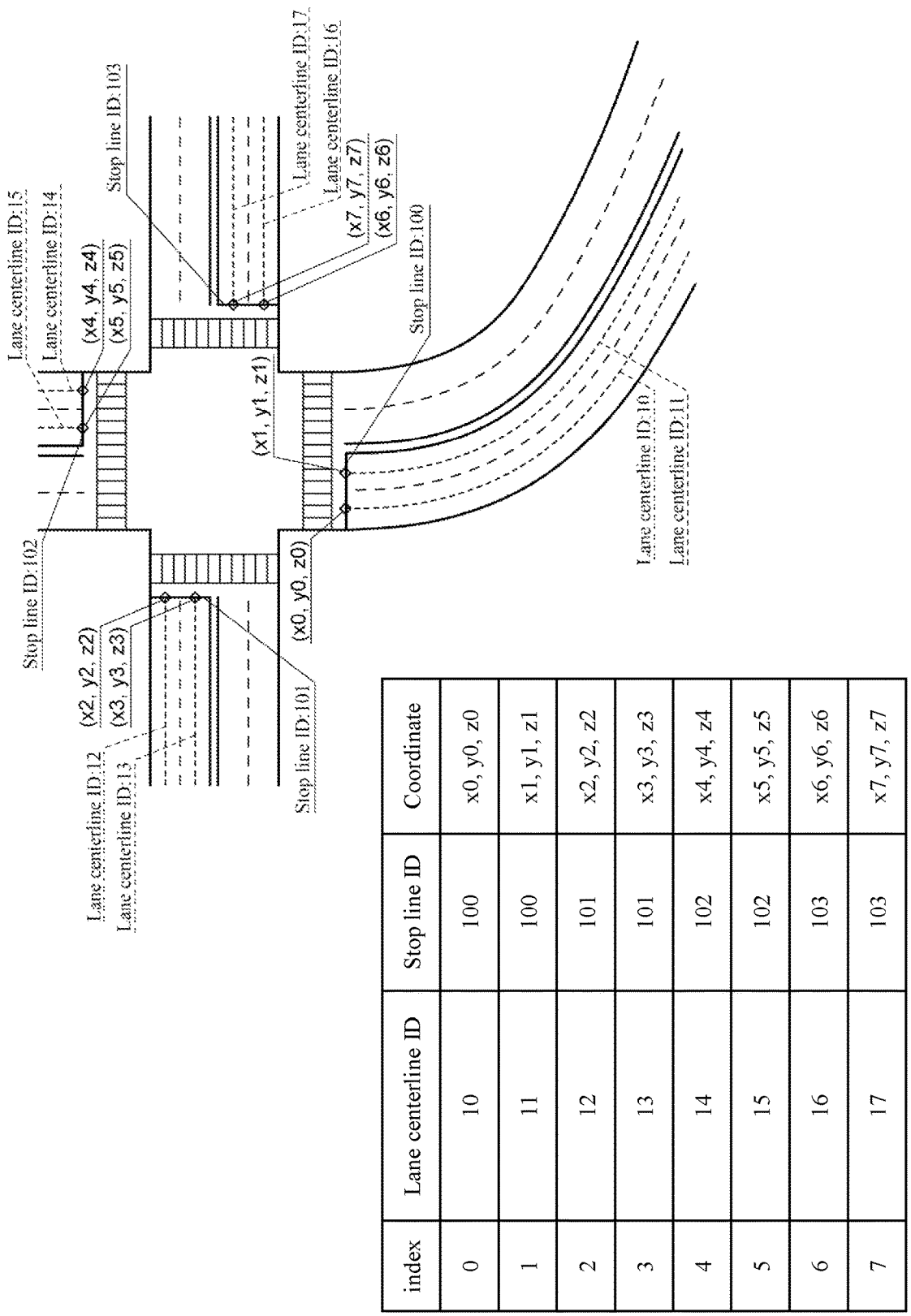
FIG. 8 is a diagram for describing information on a remaining distance for the subject vehicle to reach a stop line, which remaining distance is to be stored in the common database.

FIG. 8 is a diagram for describing information on the remaining distance for the subject vehicle to reach a stop line, which remaining distance is to be stored in the common database 110. As illustrated in the figure, the common database access unit 130 stores, in the common database 110, indexes that indicate the order of storing the information, the IDs of lane centerlines, the IDs of stop lines that intersect with the lane centerlines to which their IDs are assigned, and the absolute coordinates of intersection points between the lane centerlines and the stop lines.

Examples of the content output from the common database access unit 130 to a system that executes the functions A, B, C, D, E, . . . regarding the autonomous driving or the like include a function of a lane centerline with an argument of the ID assigned to the lane centerline, a function of a lane centerline with an argument of the position of the subject vehicle, and a function of a remaining distance from the subject vehicle to a stop line with an argument of the position of the subject vehicle. Examples of the function of a lane centerline with an argument of the ID assigned to the lane centerline and the function of a lane centerline with an argument of the position of the subject vehicle include coordinates of the point sequence of the lane centerline and information on an attribute of the lane (such as a speed limit, a curvature, or a gradient). Examples of the function of a remaining distance from the subject vehicle to a stop line with an argument of the position of the subject vehicle include the distance to a stop line which the subject vehicle encounters first when continuing to travel in the current lane.

The update information acquisition unit 140 illustrated in FIG. 1 receives update information from external of the subject vehicle via an onboard communication terminal using wireless communication such as the Long Term Evolution (LTE) line, 4G line, or 5G line. Examples of the update information include information transmitted from a server owned by an automobile manufacturer, other business company, or the like and information delivered from a server that delivers road traffic information. Examples of the update information transmitted from a server owned by an automobile manufacture or the like include information on a difference between the new generation map data and the old generation map data. On the other hand, examples of the information delivered from a server that delivers road traffic information include information on lane closure, information regarding lane connection change, and information regarding lane shape change. The lane closure, lane connection change, lane shape change, etc. are represented by information generated in a server that delivers road traffic information on the basis of road construction information, road accident information, new road information, etc.

The database editing unit 150 edits the content stored in the common database 110 in accordance with the update information acquired by the update information acquisition unit 140. For example, when the update information acquired by the update information acquisition unit 140 includes information on lane closure and/or information regarding lane connection change, the database editing unit 150 deletes the corresponding lane or lanes stored in the common database 110 and/or deletes the connection between the corresponding lane or lanes and the relating lane or lanes located ahead.

Figure 9:
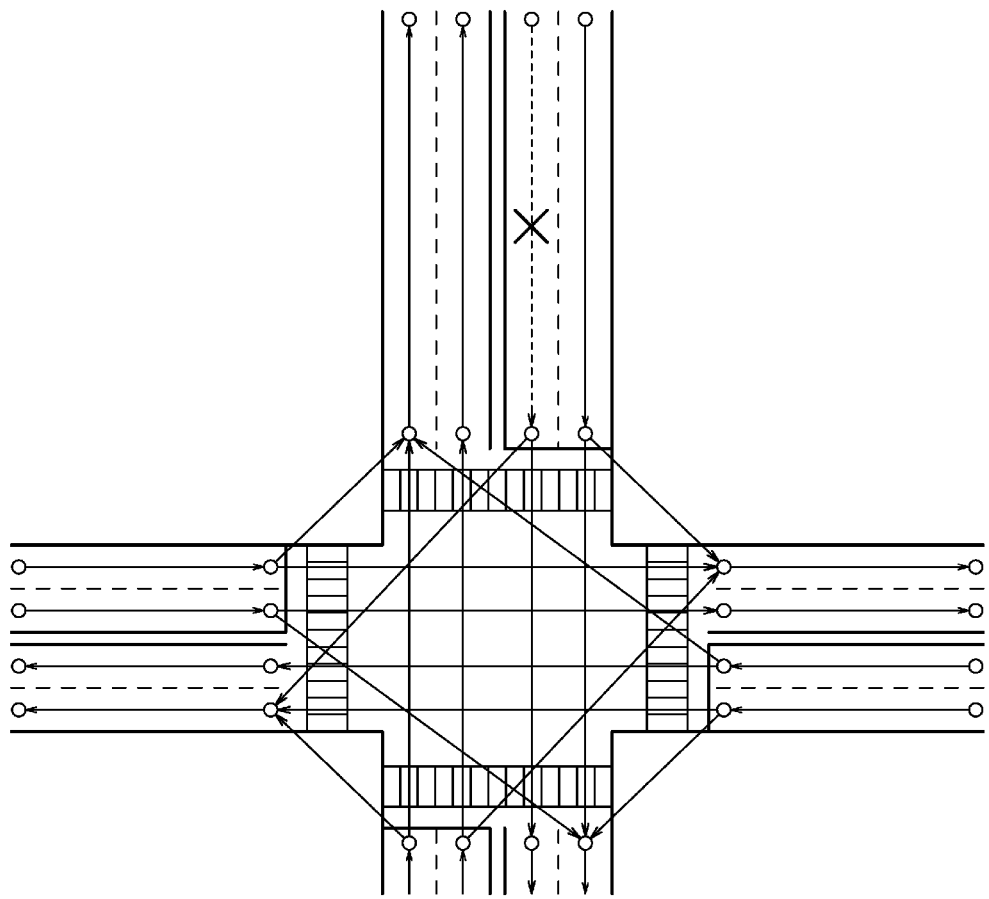
FIG. 9 is a diagram illustrating an example of editing lanes stored in the common database when update information acquired by an update information acquisition unit includes information on lane closure.
Figure 10:
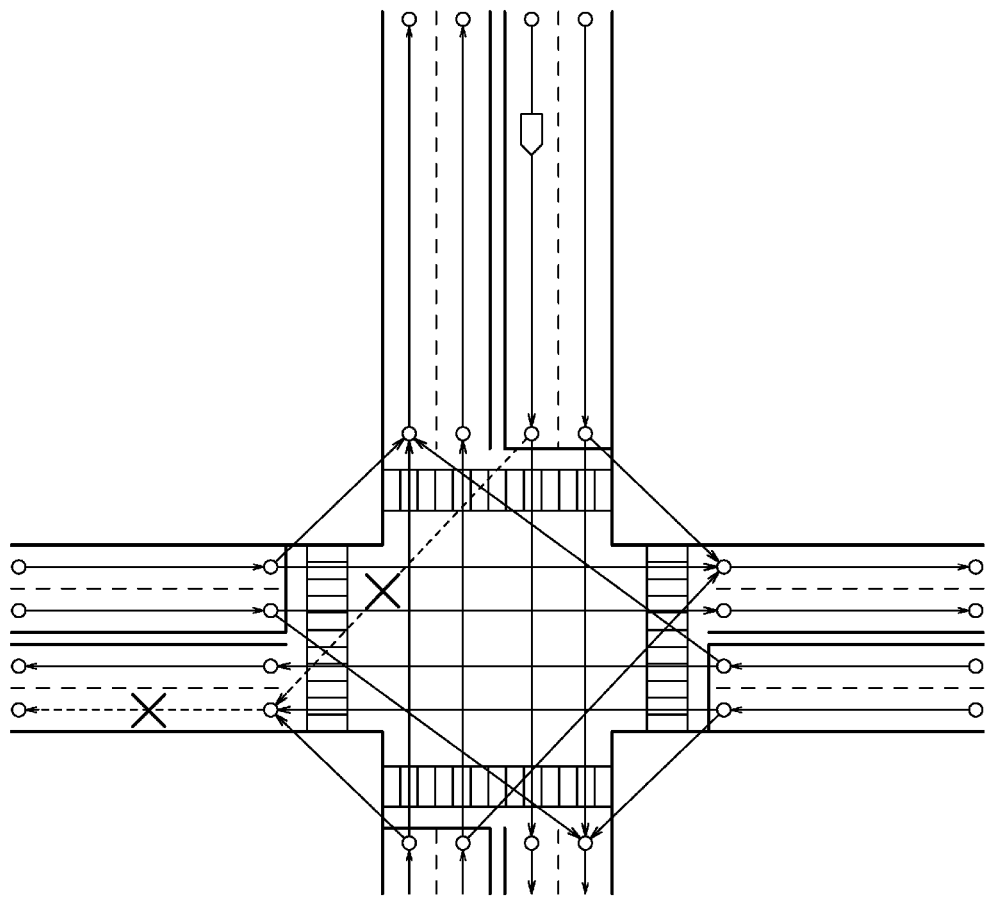
FIG. 10 is a diagram illustrating an example of editing lanes stored in the common database when the update information acquired by the update information acquisition unit includes information on lane closure.

FIG. 9 and FIG. 10 are each a diagram illustrating an example of editing lanes stored in the common database 110 when the update information acquired by the update information acquisition unit 140 includes information on lane closure. As illustrated in FIG. 9, when a lane located before the intersection is closed, the closed lane located before the intersection and stored in the common database 110 is deleted. On the other hand, as illustrated in FIG. 10, when a lane immediately after the subject vehicle passes through the intersection is closed and the subject vehicle is traveling before the intersection, the closed lane immediately after the subject vehicle passes through the intersection is deleted, and the connection between the closed lane and a relating lane before the intersection is deleted. This can avoid the risk that the subject vehicle enters the closed lane after passing through the intersection.

Here, when a lane is closed, it is necessary to prevent the vehicle from entering the closed lane, so it is necessary to delete the closed lane and/or delete the connection between the closed lane and a relating lane located ahead, but it is not necessary to change the lane shape. In one or more embodiments of the present invention, therefore, from the viewpoint of suppressing an increase in the processing amount related to the content editing and also suppressing the usage of resources, when a lane is closed, the database editing unit 150 deletes the closed lane and/or deletes the connection between the closed lane and a relating lane located ahead, but does not change the lane shape.

Figure 11:
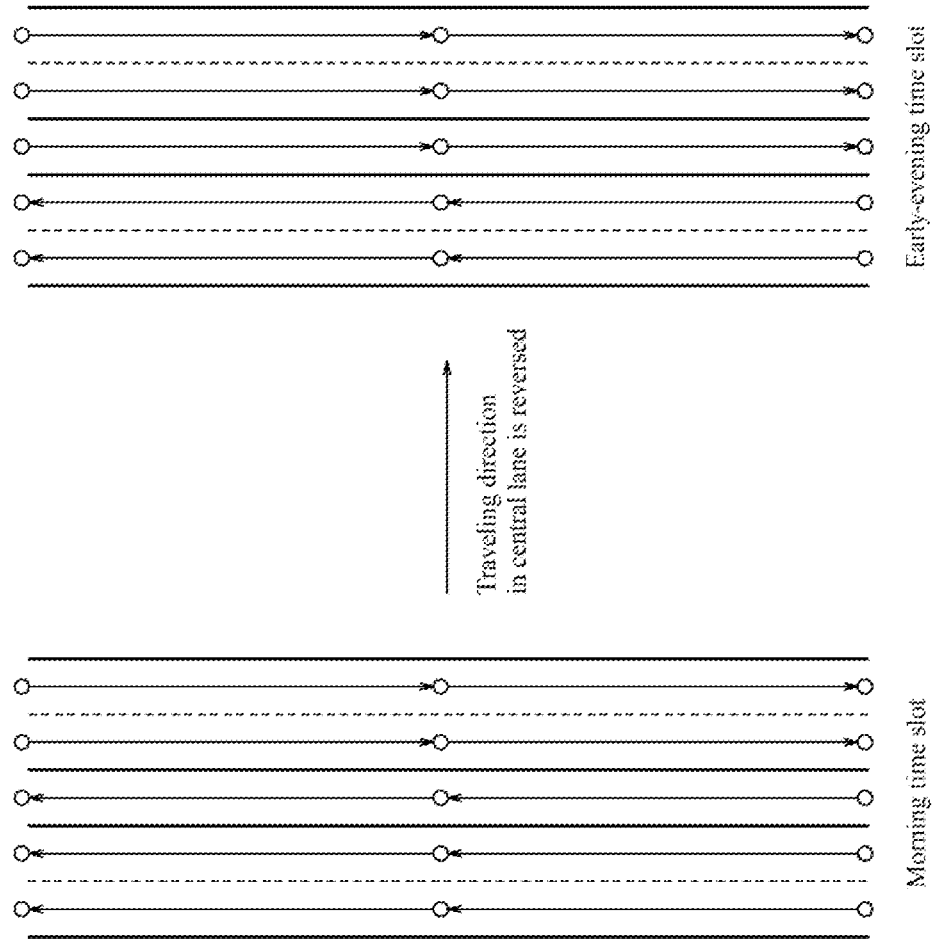
FIG. 11 is a diagram illustrating an example of editing lanes stored in the common database when the update information acquired by the update information acquisition unit is information in which the traveling direction in a central lane is reversed depending on the time slot.

FIG. 11 is a diagram illustrating an example of editing lanes stored in the common database 110 when the update information acquired by the update information acquisition unit 140 is information in which the traveling direction in the central lane is reversed depending on the time slot. As illustrated in the figure, when the traveling direction in the central lane is reversed between the morning time slot and the early-evening time slot (the traveling direction in the daytime time slot is the same as that in the morning time slot or the early-evening time slot), for example, the central lane is deleted and the connection between the central lane and another lane relating to the central lane is deleted for a certain period before and after the time when the traveling direction in the central lane is changed. This can avoid the risk that the subject vehicle enters the central lane in the opposite direction to the traveling direction in the central lane before and after the traveling direction is changed.

The database editing unit 150 has a database editing function of editing the content stored in the common database 110 in accordance with the update information acquired by the update information acquisition unit 140. Examples of the database editing function include a lane connection information editing function. The lane connection information editing function is a function of deleting, when the update information acquired by the update information acquisition unit 140 includes information on lane closure and/or information regarding lane connection change, the corresponding lane or lanes stored in the common database 110 and/or deleting the connection between the corresponding lane or lanes and the relating lane or lanes located ahead.

Examples of the database editing function of the database editing unit 150 further include a lane shape editing function. The lane shape editing function is a function of changing, when the update information acquired by the update information acquisition unit 140 includes information regarding lane shape change, the shape of the corresponding lane stored in the common database 110. In one or more embodiments of the present invention, when the update information acquired by the update information acquisition unit 140 includes information regarding lane shape change, the database editing unit 150 changes the shape of the corresponding lane on the basis of the shape of the lane and the shapes of lanes connecting to the lane from ahead and/or behind.

Figure 12:
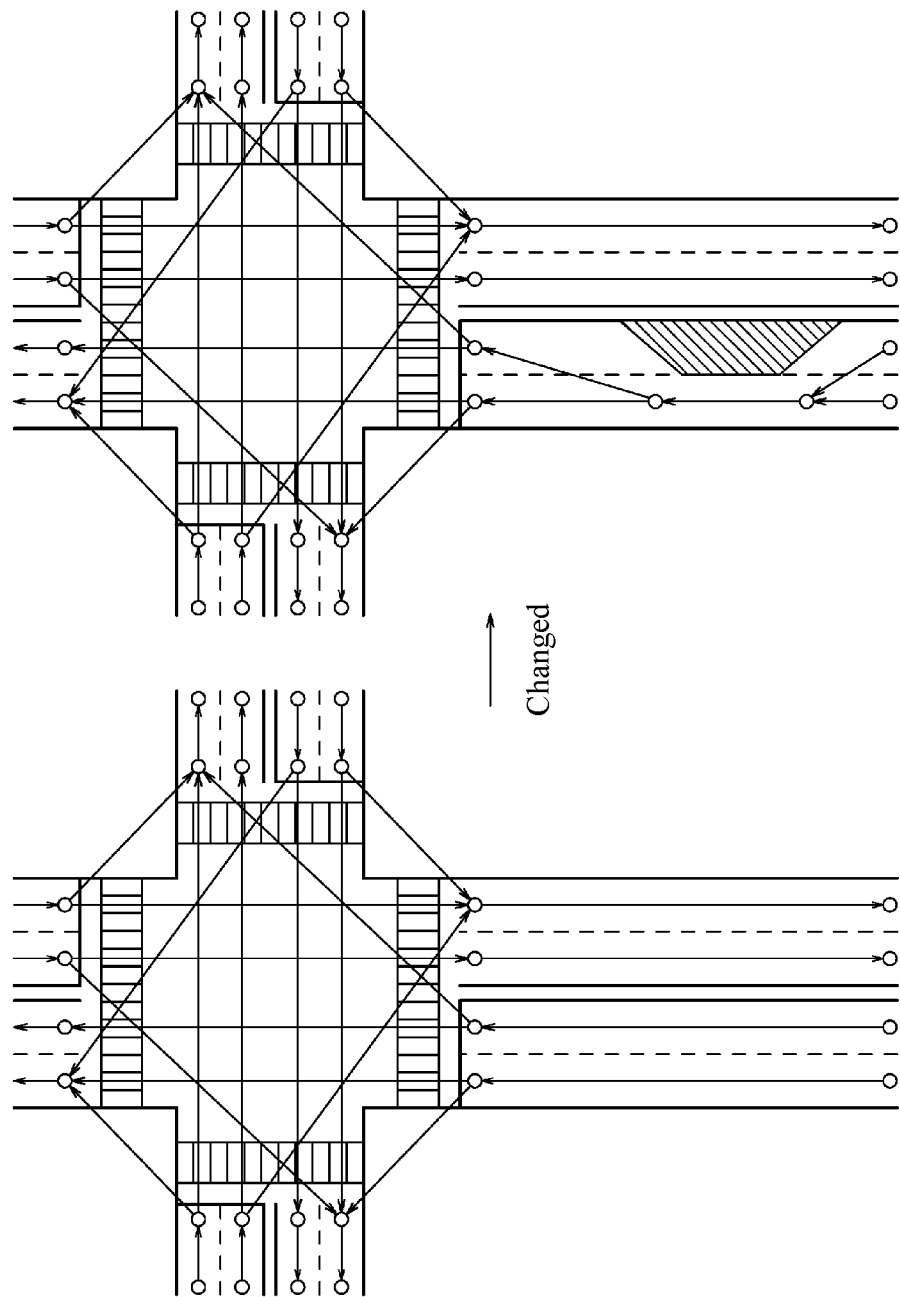
FIG. 12 is a diagram illustrating an example of editing lanes stored in the common database when the update information acquired by the update information acquisition unit includes lane shape change.

FIG. 12 is a diagram illustrating an example of editing lanes stored in the common database 110 when the update information acquired by the update information acquisition unit 140 includes lane shape change. As illustrated in the figure, when the lane located before the intersection is not completely closed and part of the lane located before the intersection is impassable, the database editing unit 150 changes the lane shape stored in the common database 110 on the basis of the lane immediately after passing through the intersection. For example, when such an impassable position exists on the right-side lane before the intersection and the vehicle is to turn right at the intersection, the lane shape is changed to a shape such that the vehicle changes lanes to the adjacent lane before the impassable position and returns to the original lane immediately after passing through the impassable position.

Here, when the update information acquired by the update information acquisition unit 140 does not include the lane shape itself, the lane information may be generated on the basis of travel trajectory information of the vehicle in a tile that is set on the basis of the traveling area of the subject vehicle. For example, the lane boundary lines may be generated on the basis of the lane width based on the road attribute included in the map data and the travel trajectory information of the vehicle.

Figure 13:
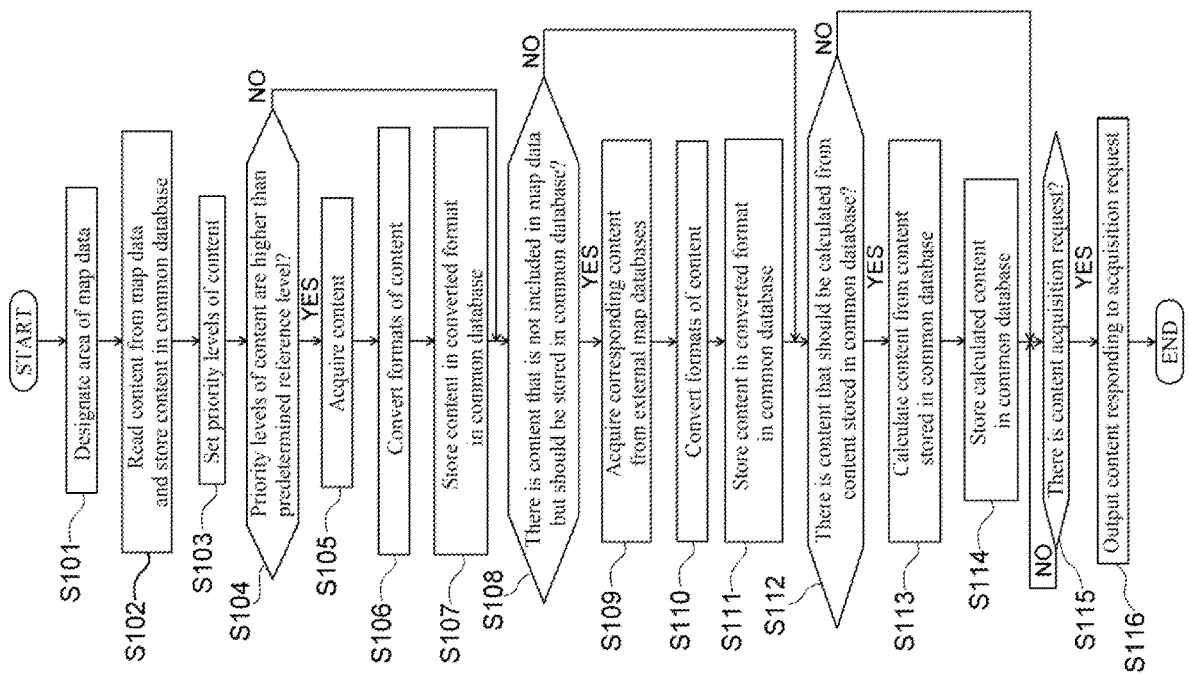
FIG. 13 is a flowchart for describing a process of storing map data content in the common database.

FIG. 13 is a flowchart for describing a process of storing the map data content in the common database 110. As illustrated in the flowchart, first, in step S101, the common database access unit 130 designates an area of the map data for which the content is stored in the common database 110, in accordance with the traveling area of the subject vehicle. Then, in step S102, the common database access unit 130 reads the content of the area designated in step S101 from the map data 101 and stores the content in the common database 110.

Then, in step S103, the format conversion unit 121A for map database A, the format conversion unit 121B for map database B, the format conversion unit 121C for map database C, . . . set the priority levels of content to be acquired in accordance with the levels for achieving the functions A, B, C, D, E, . . . regarding the autonomous driving or the like. Then, in step S104, the content acquisition units 122A, 122B, 122C, . . . determine whether or not the priority levels of content that can be acquired from the map databases A, B, C, . . . are higher than a predetermined reference level. An affirmative determination in step S104 is followed by step S105 while a negative determination in step S104 is followed by step S108.

In step S105, the content acquisition units 122A, 122B, 122C, . . . acquire the content with higher priority levels than the predetermined reference level from the map databases A, B, C, . . . . Then, in step S106, the format conversion unit 121A for map database A, the format conversion unit 121B for map database B, the format conversion unit 121C for map database C, . . . convert the formats of the content, which is acquired from the map databases A, B, C, . . . by the content acquisition units 122A, 122B, 122C, . . . , to a format compatible with a system that executes the functions A, B, C, D, E, . . . regarding the autonomous driving or the like. Then, in step S107, the format conversion unit 121A for map database A, the format conversion unit 121B for map database B, the format conversion unit 121C for map database C, . . . store the content in the converted format in the common database 110.

Then, in step S108, the content acquisition units 122A, 122B, 122C, . . . determine whether or not there is content that is not included in the map data 101 but should be stored in the common database 110. An affirmative determination in step S108 is followed by step S109 while a negative determination in step S108 is followed by step S112. In step S109, the content acquisition units 122A, 122B, 122C, . . . acquire the content that is not included in the map data 101 but should be stored in the common database 110, from the map databases A, B, C, . . . . Then, in step S110, the format conversion unit 121A for map database A, the format conversion unit 121B for map database B, the format conversion unit 121C for map database C, . . . convert the formats of the content, which is acquired from the map databases A, B, C, . . . by the content acquisition units 122A, 122B, 122C, . . . , to a format compatible with a system that executes the functions A, B, C, D, E, . . . regarding the autonomous driving or the like. Then, in step S111, the format conversion unit 121A for map database A, the format conversion unit 121B for map database B, the format conversion unit 121C for map database C, . . . store the content in the converted format in the common database 110.

In step S112, the content acquisition units 122A, 122B, 122C, . . . determine whether or not there is content that should be calculated on the basis of the content stored in the common database 110. An affirmative determination in step S112 is followed by step S113 while a negative determination in step S112 is followed by step S115.

In step S113, the content acquisition units 122A, 122B, 122C, . . . calculate content that is not stored in the common database 110 on the basis of the content stored in the common database 110. Then, in step S114, the format conversion unit 121A for map database A, the format conversion unit 121B for map database B, the format conversion unit 121C for map database C, . . . store the calculated content in the common database 110.

Then, in step S115, the common database access unit 130 determines whether or not there is a content acquisition request from a system that executes the functions A, B, C, D, E, . . . regarding the autonomous driving or the like. An affirmative determination in step S115 is followed by step S116. In step S116, the common database access unit 130 reads the requested content from the common database 110 and outputs the content to the system which executes the functions A, B, C, D, E, . . . . The process of storing the map data content in the common database 110 is thus completed.

Figure 14:
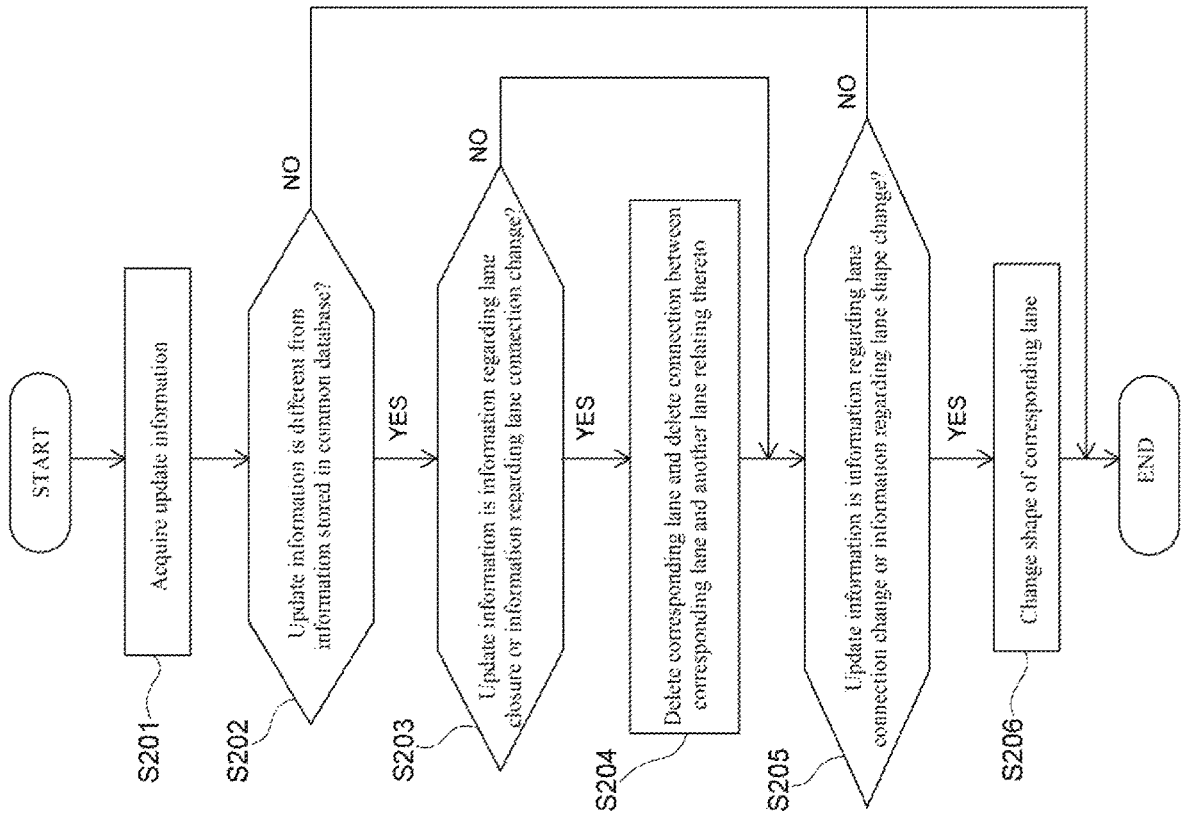
FIG. 14 is a flowchart for describing a process of editing the map data content stored in the common database.

FIG. 14 is a flowchart for describing a process of editing the map data content stored in the common database 110. As illustrated in the flowchart, the update information acquisition unit 140 receives update information from external of the subject vehicle during the online mode (step S201). Then, the database editing unit 150 determines whether or not the update information acquired by the update information acquisition unit 140 is different from the information stored in the common database 110 (step S202). An affirmative determination in step S202 is followed by step S203 while a negative determination in step S202 is followed by completion of the process.

In step S203, the database editing unit 150 determines whether or not the update information acquired by the update information acquisition unit 140 is information regarding lane closure or information regarding lane connection change. An affirmative determination in step S203 is followed by step S204 while a negative determination in step S203 is followed by step S205. In step S204, the database editing unit 150 deletes the corresponding lane stored in the common database 110 and changes the connection between the corresponding lane and another lane relating to the corresponding lane.

Then, in step S205, the database editing unit 150 determines whether or not the update information acquired by the update information acquisition unit 140 is information regarding lane connection change or information regarding lane shape change. An affirmative determination in step S205 is followed by step S206 while a negative determination in step S205 is followed by completion of the process.

In step S206, the database editing unit 150 changes the shape of the corresponding lane stored in the common database 110. The process of editing the map data content stored in the common database 110 is thus completed.

As described above, in the map data storage method and device according to one or more embodiments of the present invention, formats of the acquired map data content are converted to a predetermined format that can be used in the subject vehicle, the map data content converted into the predetermined format is stored in the common database 110, update information regarding the map data content stored in the common database 110 is acquired, and the map data content in the above predetermined format stored in the common database 110 is edited on the basis of the acquired update information. Through this operation, whatever be the formats of the map data content acquired from external map databases A, B, C, . . . , the map data content can be used to edit the map data content used in the subject vehicle.

In one or more embodiments of the present invention, one type of the above predetermined format is set for each item of the map data content. For example, as described above, the formats of lane boundary lines and lane centerlines are unified to a format in which the lane boundary lines and the lane centerlines are expressed by point sequences (see FIG. 4). According to the above feature, one type of the predetermined format is set for each item of the content to be compatible with programs of a system that executes the functions A, B, C, . . . regarding the autonomous driving or the like on the vehicle side, and the acquired map data content can thereby be used to run the system without changing the programs of the system.

Here, content in formats in which lines are expressed by point sequences may have a larger data capacity as compared with a format in which lines are expressed by mathematical formulae such as B-Spline curves (see FIG. 5). In one or more embodiments of the present invention, therefore, one type of the predetermined format set for each item of the map data content is made to a format in which lines are expressed by point sequences, and the capacity of data to be stored in the common database 110 is thereby suppressed.

In the map data storage method and device according to one or more embodiments of the present invention, a priority level is assigned to the map data content in accordance with a use frequency in the subject vehicle, the map data content with a higher priority level is preferentially acquired, and the acquired map data content is converted into the predetermined format and stored in the database. That is, the content subjected to the format conversion process and the storage process into the common database 110 is limited to content that has a high degree of necessity, such as lane boundary lines and lane connections. This can prevent a shortage of necessary content in a system that executes the functions A, B, C, . . . regarding the autonomous driving or the like on the vehicle side. Moreover, the processing amount can be reduced in the format conversion process for the content and the storage process into the common database 110, and the memory usage in the common database 110 can also be suppressed.

In the map data storage method and device according to one or more embodiments of the present invention, map data content that is not included in the map data possessed by the subject vehicle is acquired from the map databases A, B, C, . . . , the formats of the acquired map data content are converted to the above predetermined format, and the map data content in the converted format is stored in the common database 110 (see FIG. 8). Through this operation, even when the necessary content increases in a system that executes the functions A, B, C, . . . regarding the autonomous driving or the like on the vehicle side, the shortage of the increased content can be prevented.

In the map data storage method and device according to one or more embodiments of the present invention, content that is not included in the map data 101 possessed by the subject vehicle is generated on the basis of the map data content stored in the common database 110, and the generated map data content is stored in the common database 110 (see FIG. 8). Through this operation, even when the necessary content increases in a system that executes the functions A, B, C, . . . regarding the autonomous driving or the like on the vehicle side, the shortage of the increased content can be prevented. Moreover, by storing the generated content in the common database 110, it is unnecessary to generate the content every time the content is requested from a system that executes the functions A, B, C, . . . regarding the autonomous driving or the like on the vehicle side, and the processing amount in the process of generating the content can be suppressed.

In the map data storage method and device according to one or more embodiments of the present invention, the map data content is acquired in accordance with information on the current position of the subject vehicle (see FIG. 2). Through this operation, the map data content can be converted into the format in accordance with the current position of the subject vehicle and stored in the common database 110, and a system that executes the functions A, B, C, . . . regarding the autonomous driving or the like on the vehicle side can use the map data content in accordance with the current position of the subject vehicle.

In the map data storage method and device according to one or more embodiments of the present invention, when information regarding lane closure or information regarding lane connection as the update information is acquired, the information regarding the lane connection stored in the common database 110 is edited (see FIG. 10). Through this operation, when a system that executes the autonomous driving function of the subject vehicle uses the map data content stored in the common database 110, the subject vehicle can be prevented from entering a closed lane. Here, when a lane is closed, it is necessary to delete the closed lane and/or delete the connection between the closed lane and a relating lane located ahead, but it is not necessary to change the lane shape. In one or more embodiments of the present invention, therefore, when a lane is closed, only the closed lane and the connection between the closed lane and another lane relating to the closed lane are deleted without changing the lane shape. This can suppress an increase in the processing amount related to the content editing and also suppress the usage of resources.

In the map data storage method and device according to one or more embodiments of the present invention, when information regarding lane closure immediately after an intersection is acquired during travel of the subject vehicle before the intersection, a lane located before the intersection and connected to the closed lane and connection between the lane located before the intersection and another lane relating to the lane, as the update information stored in the common database 110, are deleted (see FIG. 10). Through this operation, when a system that executes the autonomous driving function of the subject vehicle uses the map data content stored in the common database 110, the subject vehicle can be prevented from entering the closed lane after passing through the intersection.

In the map data storage method and device according to one or more embodiments of the present invention, when the traveling direction in a lane is changed, the lane and connection between the lane and another lane relating to the lane are deleted for a predetermined time (see FIG. 11). Through this operation, when a system that executes the autonomous driving function of the subject vehicle uses the map data content stored in the common database 110, the subject vehicle can be prevented from entering the lane in the opposite direction to the traveling direction in the lane which has been changed.

In the map data storage method and device according to one or more embodiments of the present invention, when information regarding lane connection or information regarding lane shape change as the update information is acquired, information regarding a lane shape stored in the common database 110 is edited (see FIG. 12). For example, when an impassable position exists on the right-side lane before an intersection and the vehicle is to turn right at the intersection, the lane shape is changed to a shape such that the vehicle changes lanes to an adjacent lane before the impassable position and returns to the original lane immediately after passing through the impassable position. Through this operation, when a system that executes the autonomous driving function of the subject vehicle uses the map data content stored in the common database 110, even if an impassable position exists in the traveling direction, the subject vehicle can be controlled to travel in a desired direction while avoiding the impassable position.

In the map data storage method and device according to one or more embodiments of the present invention, information regarding a lane shape is generated on the basis of information on a travel trajectory of the subject vehicle, and the information regarding the lane shape stored in the common database 110 is edited on the basis of the generated information regarding the lane shape. Through this operation, even when information on lane boundary lines cannot be acquired from the map databases A, B, C, . . . , the information regarding the lane shape stored in the common database 110 can be edited.

In the map data storage method and device according to one or more embodiments of the present invention, a lane boundary line as the lane shape is generated on the basis of information on the travel trajectory of the subject vehicle and a lane width as road attribute information, and the information regarding the lane boundary line stored in the common database 110 is edited on the basis of the generated lane boundary line. Through this operation, even when information on lane boundary lines cannot be acquired from the map databases A, B, C, . . . , the information regarding the lane boundary lines stored in the common database 110 can be edited.

In the map data storage method and device according to one or more embodiments of the present invention, the shape of a corresponding lane stored in the common database 110 is changed on the basis of the shape of a lane located ahead of and/or behind the corresponding lane (see FIG. 12). Through this operation, when the lane shape stored in the common database 110 is changed, the lane shape can be changed to a smooth lane shape.

Embodiments heretofore explained are described to facilitate understanding of the present invention and are not described to limit the present invention. It is therefore intended that the elements disclosed in the above embodiments include all design changes and equivalents to fall within the technical scope of the present invention. For example, when there are two or more types of formats of content compatible with a system that execute the functions A, B, C, . . . regarding the autonomous driving or the like of the subject vehicle, the formats of the acquired content may not have to be converted to one type of format and may be changed to a format selected from among the two or more types of formats or modified in an appropriate manner.

DESCRIPTION OF REFERENCE NUMERALS

100 Map data storage device
110 Common database
120 Database standardization unit
130 Common database access unit
140 Update information acquisition unit
150 Database editing unit

The invention claimed is:

1. A map data storage method for acquiring map data content used in a subject vehicle and storing the map data content in a database by using a controller, comprising:
assigning, by the controller, priority levels to the map data content;
acquiring, by the controller, at least one of a lane boundary line or lane connection in the map data content on a basis of the assigned priority levels;
converting, by the controller, a format of the acquired map data content to a predetermined format that can be used in the subject vehicle;
storing, by the controller the converted map data content in the database;
acquiring, by the controller, update information from an external source, wherein the update information is new map data content that has been added or changed since the stored map data content was converted and stored in the database;
editing, by the controller, the stored map data content on a basis of the acquired update information; and
using, by the controller, the edited map data content to control the subject vehicle.

2. The map data storage method according to claim 1, wherein one type of the predetermined format is set for each item of the map data content.

3. The map data storage method according to claim 2, wherein the predetermined format is a format in which a line is expressed by a point sequence.

4. The map data storage method according to claim 1, comprising:
assigning the priority levels to the map data content based on use frequency of the map data content in the subject vehicle; and
acquiring the map data content with the higher priority level, converting the map data content into the predetermined format, and storing the map data content in the database.

5. The map data storage method according to claim 4, comprising:
setting the priority level of a lane boundary line and lane connection as the map data content to a level that allows the map data content to be acquired, converted into the predetermined format, and stored in the database.

6. The map data storage method according to claim 1, comprising:
acquiring content that is not included in the map data possessed by the subject vehicle;
converting the format of the acquired map data content to the predetermined format; and
storing the map data content converted into the predetermined format in the database.

7. The map data storage method according to claim 1, comprising:
generating content that is not included in the map data possessed by the subject vehicle on a basis of the map data content stored in the database; and
storing the generated map data content in the database.

8. The map data storage method according to claim 1, comprising:
acquiring the map data content in accordance with current positional information of the subject vehicle.

9. The map data storage method according to claim 1, comprising:
when acquiring information regarding lane closure or information regarding lane connection as the update information, editing the information regarding the lane connection stored in the database.

10. The map data storage method according to claim 1, comprising:
when acquiring information regarding lane closure as the update information, deleting the closed lane and connection between the closed lane and another lane relating to the closed lane, the closed lane and the connection being stored in the database.

11. The map data storage method according to claim 1, comprising:
when acquiring information regarding lane closure immediately after an intersection during travel of the subject vehicle before the intersection, deleting a lane located before the intersection and connected to the closed lane and connection between the lane located before the intersection and another lane relating to the lane, the lane and the connection being stored in the database as the update information.

12. The map data storage method according to claim 1, comprising:

when a traveling direction in a lane is changed, deleting the lane and connection between the lane and another lane relating to the lane for a predetermined time.

13. The map data storage method according to claim 1, comprising:

when acquiring information regarding lane connection or information regarding lane shape change as the update information, editing information regarding a lane shape stored in the database.

14. The map data storage method according to claim 1, comprising:

generating information regarding a lane shape on a basis of information on a travel trajectory of the subject vehicle; and editing the information regarding the lane shape stored in the database, on a basis of the generated information regarding the lane shape.

15. The map data storage method according to claim 14, comprising:

generating a lane boundary line as the lane shape on a basis of the information on the travel trajectory of the subject vehicle and a lane width as road attribute information; and editing information regarding the lane boundary line stored in the database on a basis of the generated lane boundary line.

16. The map data storage method according to claim 13, comprising:

changing a shape of a corresponding lane stored in the database on a basis of a shape of a lane located ahead of and/or behind the corresponding lane.

17. A map data storage device comprising a controller configured to acquire map data content used in a subject vehicle and store the map data content in a database, the controller being further configured to:

assign priority levels to the map data content;

acquire at least one of a lane boundary line or lane connection in the map data content on a basis of the assigned priority levels;

convert a format of the acquired map data content to a predetermined format that allows the map data content to be used in the subject vehicle;

store the converted map data content in the database;

acquire update information from an external source, wherein the update information is new map data content that has been added or changed since the stored map data content was converted and stored in the database;

edit the stored map data content on a basis of the acquired update information; and output the edited map data content, wherein the edited map data content is used to control the subject vehicle.

18. The map data storage method according to claim 1, further comprising:

assigning the priority levels to the map data content in accordance with a function regarding an autonomous driving.

\* \* \* \* \*